United States Patent
Aarons et al.

(10) Patent No.: US 6,815,906 B1
(45) Date of Patent: Nov. 9, 2004

(54) GAS DISCHARGE LAMP DRIVE CIRCUITRY

(76) Inventors: David John Aarons, Manor Farm, Home Farm Road, Ellingham, Bungay, Suffolk (GB), NR35 2EL; John Mullenger, Green Farm, Wickham Skeith, Suffolk (GB), IP23 8LX ( * ) Notice: Subject to any disclaimer, the term of this patent is extended or adjusted under 35 U.S.C. 154(b) by 0 days.

(21) Appl. No.: 09/423,484

(22) PCT Filed: May 7, 1998

(86) PCT No.: PCT/GB98/01155
§ 371 (c)(1),
(2), (4) Date: Oct. 4, 2000

(87) PCT Pub. No.: WO98/51134
PCT Pub. Date: Nov. 12, 1998

(30) Foreign Application Priority Data

May 7, 1997 (GB) .......................................... 9709075

(51) Int. Cl.[7] .......................................... H05B 37/00
(52) U.S. Cl. ............................. 315/209 R; 315/224
(58) Field of Search ............................. 315/291, 307, 315/224, 209 R, 219, 276, 244, 209 SC, 225, 308, 247

(56) References Cited

U.S. PATENT DOCUMENTS

| 3,346,794 A | 10/1967 | Stemmler .................... 318/227 |
| 4,087,722 A | 5/1978 | Hanock ................... 315/200 A |
| 4,277,726 A * | 7/1981 | Burke ........................ 315/307 |
| 4,464,606 A | 8/1984 | Kane ........................... 315/158 |
| 4,682,084 A * | 7/1987 | Kuhnel et al. ............... 315/307 |
| 4,998,046 A * | 3/1991 | Lester ..................... 315/209 R |
| 5,367,223 A | 11/1994 | Eccher ........................ 315/97 |
| 5,408,404 A | 4/1995 | Mitchell ....................... 363/71 |
| 5,434,479 A | 7/1995 | Ohnishi et al. ......... 315/209 R |
| 5,455,487 A | 10/1995 | Mix et al. .................... 315/150 |
| 5,754,011 A * | 5/1998 | Frus et al. ............ 315/209 SC |
| 6,040,662 A * | 3/2000 | Asayama .................... 315/291 |

FOREIGN PATENT DOCUMENTS

| DE | 1927904 | 12/1970 |
| EP | 0472265 | 2/1992 |
| EP | 0510751 | 10/1992 |
| GB | 2113486 | 8/1983 |
| GB | 2212995 | 8/1989 |
| GB | 2274359 | 7/1994 |
| GB | 2299469 | 10/1996 |

* cited by examiner

Primary Examiner—Wilson Lee
(74) Attorney, Agent, or Firm—Todd N. Hathaway

(57) ABSTRACT

An apparatus and method for driving a gas discharge lamp, and in particular for dimming fluorescent lamps or tubes. An electronic circuit for controlling a gas discharge lamp is connected to an electrical power source and generates a high frequency pulse train that is applied to the electrodes of the lamp to light the lamp. A choke limits the current drawn by the lamp. A first series of pulses is produced and independent from this a second series of pulses is produced independently from the first, the first and second series of pulses being combined additively to produce the high frequency pulse train.

16 Claims, 8 Drawing Sheets

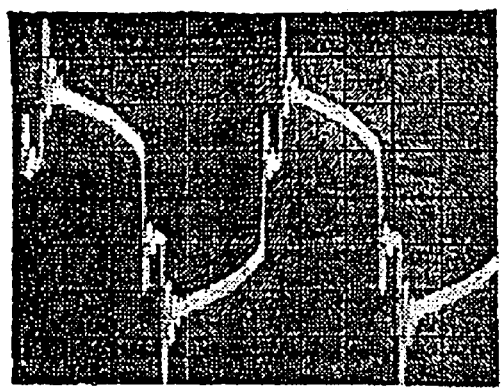
Fig. 6A       Step No 219
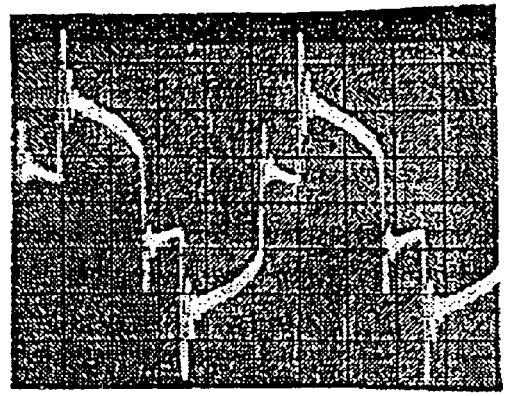
Fig. 6B       Step No 173
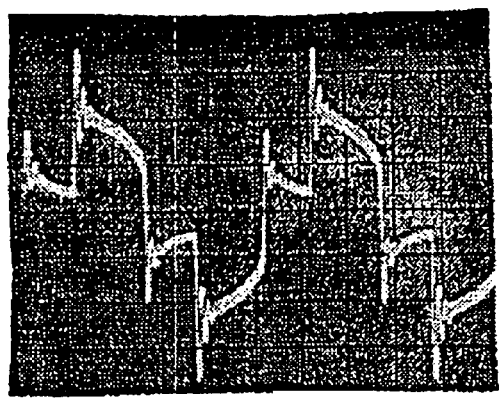
Fig. 6C       Step No 150
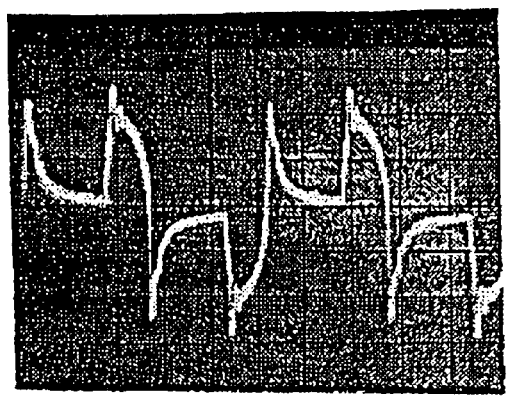
Fig. 6D       Step No 120
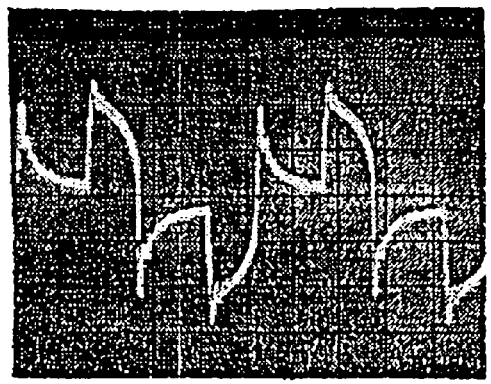
Fig. 6E       Step No 106
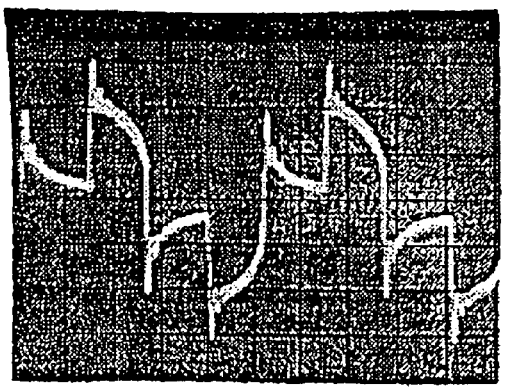
Fig. 6F       Step No 90

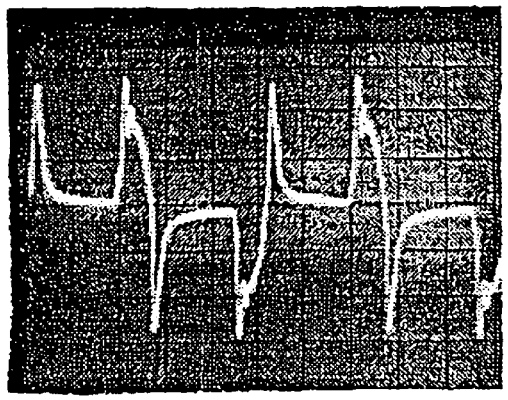
Fig. 6G     Step No 77
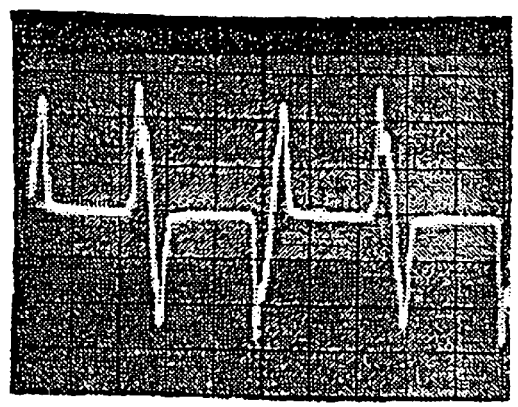
Fig. 6H     Step No 62
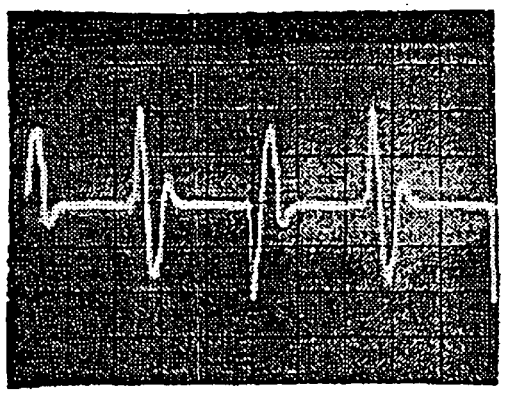
Fig. 6I     Step No 50
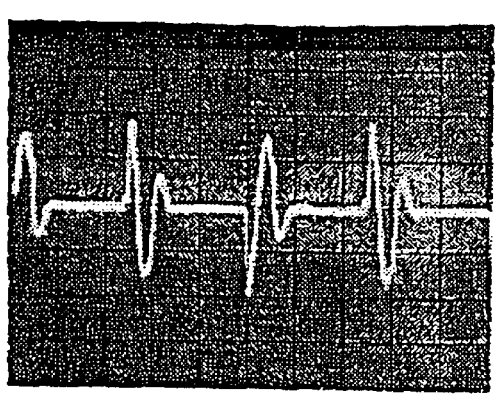
Fig. 6J     Step No 47
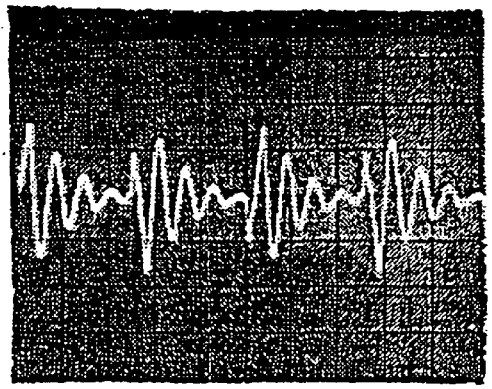
Fig. 6K     Step No 28
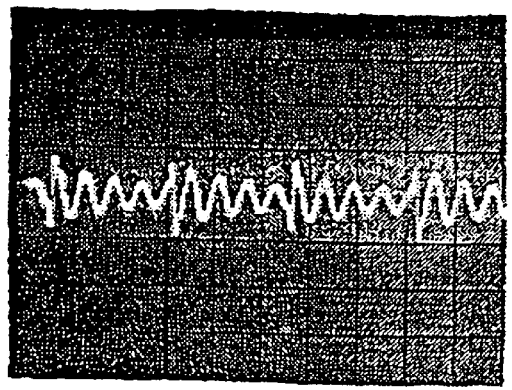
Fig. 6L     Step No 1

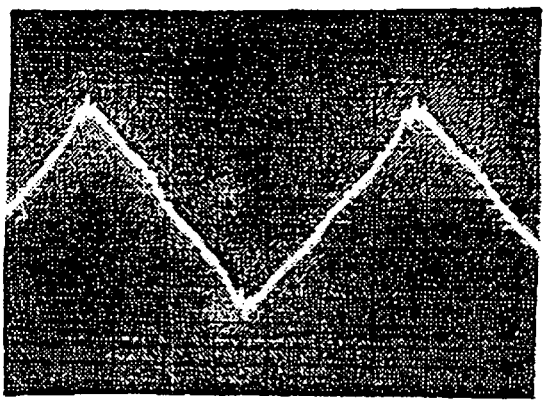
Fig. 7A    Step No. 150
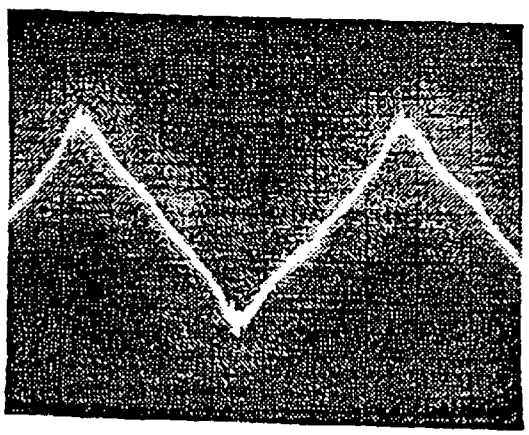
Fig. 7B    Step No 120
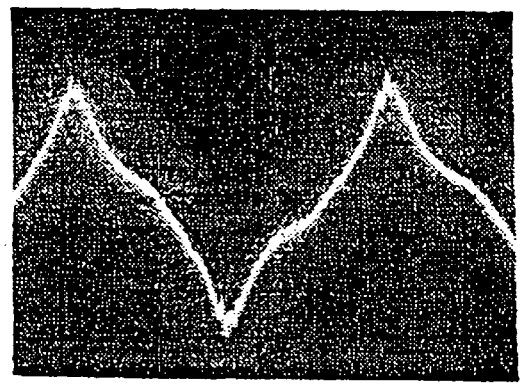
Fig. 7C    Step No 106
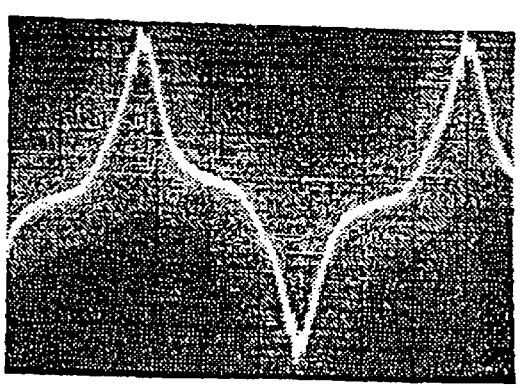
Fig. 7D    Step No 90
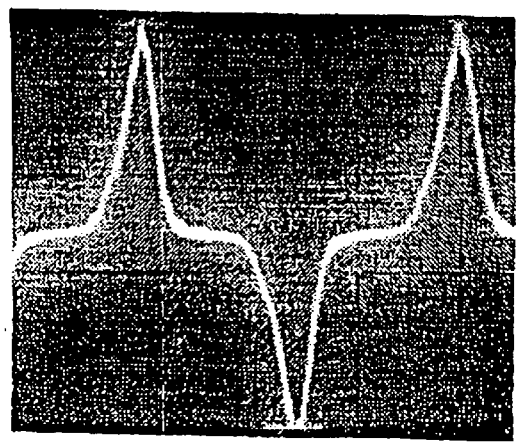
Fig. 7E    Step No 77
Fig. 7F    Step No 62

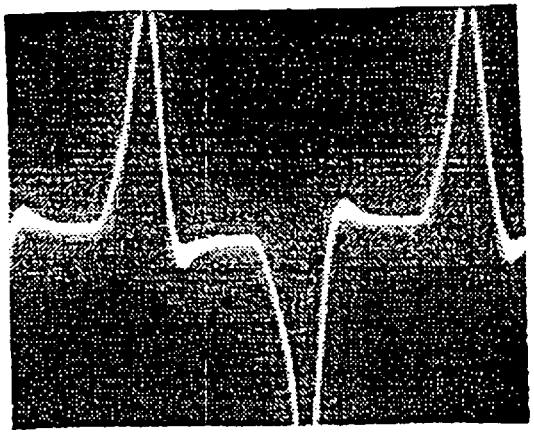
Fig. 7G  Step No 50
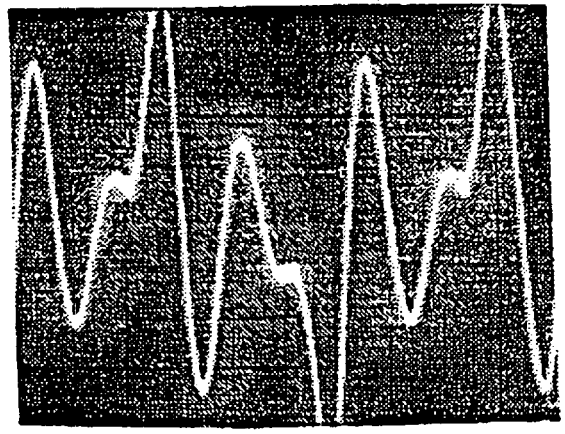
Fig. 7H  Step No 28
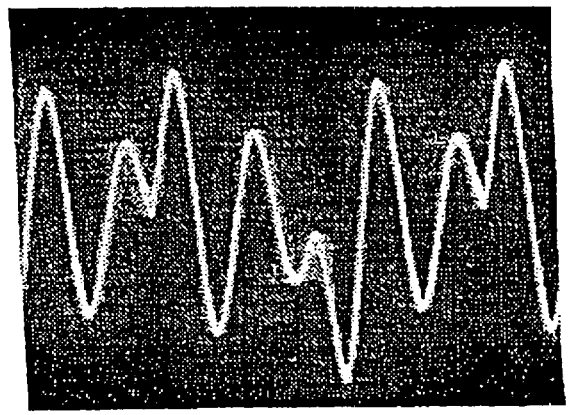
Fig. 7I  Step No 1

GAS DISCHARGE LAMP DRIVE CIRCUITRY

The present invention relates to an apparatus and method for driving a gas discharge lamp, and in particular for dimmably or non-dimmably driving fluorescent lamps or tubes.

Fluorescent lamps or tubes are widely used in the home, office and in industry to provide lighting. Such lamps generally consist of a tubular glass envelope, up to 2.44 m (8 feet) long, filled with an inert gas such as krypton or argon which when electrically excited in a gas discharge irradiates a fluorescent coating, such as a powder comprising a (Tb, Ce,Gd,Mg) borate, a (Eu,Ba,Mg) aluminate and a (Y,Eu) oxide, on the inside of the glass. An example of such a tube, 1.22 m (4 feet) long, is the model 'TL'D 36 Watt sold under the trade names "Super 80 (/840) New Generation" and "Standard (/33)" by Philips Electronic and Associated industries Limited.

All gas discharge lamps, including fluorescent lamps, require a ballast to operate. The ballast provides a high initial voltage to initiate the discharge, then rapidly limits the lamp current to safely sustain the discharge. Ballasts are manufactured for three main classes of fluorescent lamp: preheat, rapid start and instant start.

Preheat operation lamp electrodes are heated prior to initiating the discharge. A starter switch closes, permitting a current to flow through each electrode. The starter switch rapidly cools down, opening the switch, and triggering the supply voltage across the arc tube, initiating the discharge. No auxiliary power is applied across the electrodes during operation.

Rapid start operation lamp electrodes are heated prior to and during operation. A transformer has two special secondary winding to provide the proper low voltage to heat the electrodes.

Instant start operation lamp electrodes are not heated prior to operation. Ballasts for instant start lamps are designed to provide a relatively high starting voltage, as compared with preheat and rapid start lamps, to initiate the discharge across the unheated electrodes.

Prior art document U.S. Pat. No. 4,464,606 discloses a circuit for dimmably controlling a pair of fluorescent lamps, in which a push-pull transistor pair is pulse width modulated to vary the duty cycle of a pulsed current supply to the primary of a transformer to the lamps.

It is desirable to be able to dim fluorescent tubes in order achieve increased energy efficiency when full, lighting is not needed. It is known that such tubes up to 1.83 m (6 feet) long can be dimmed with appropriate control circuitry. For example, the above-mentioned 1.22 m fluorescent tube may be dimmably controlled with high frequency regulating ballast sold by Philips Lighting Limited as model number BPL136R.

With reference to Philips Lighting data sheet PL 3322, such known ballasts suffer from a number of limitations. First, it is only possible to achieve adequate control over the dimmable light output for fluorescent tubes up to 1.83 m (6 feet) in length. Secondly, it is only possible to dim down to about 10% of full light output before the tube flickers out. Thirdly, the lighting efficiency of such dimming ballasts drops steadily as the light output falls, the efficiency being 56% at 25% light output and 27% at 10% output, as a result of increased thermal losses in the tube and ballast circuitry. Thus, the benefit of decreased electricity consumption is not fully realised at low power levels.

The reason for these limitations in performance appears to stem from the way conventional non-dimmable high frequency (hf) ballasts have been adapted for use as dimmable ballasts. A conventional hf ballast generates a pulsed voltage, typically at either 28 kHz or 35 kHz, modulated on and off at a low frequency (50 Hz or 100 Hz), with an on/off ratio of 50% so that there is no hf signal during each half-cycle. A conventional dimmable hf ballast reduces the on/off ratio so that the hf pulsed voltage becomes progressively less than 50% of the duty cycle. The hf pulses are therefore applied to the fluorescent tube for a lower average duty cycle and as fewer hf pulses are applied to the tube, the tube dims.

In general, a number of limitations have been noted with such dimmable systems. First of all, because conventional fluorescent ballasts include a choke with a substantial inductance, proportionately greater amounts of energy are lost in ohmic heating of the choke as the tube is dimmed. Secondly, as the tube is dimmed, a point is reached where the tube fails to strike properly owing to the increasingly large proportion of time when the hf voltage is not applied to the tube. The tube therefore tends suddenly to flicker off before it has been fully dimmed, owing to the increasingly discontinuous nature of the pulse train applied to the tube. These problems become worse for increased length of fluorescent tube and consequently it is believed that there are no commercially available dimmable or non-dimmable ballasts for 2.44 m tubes, and the dimmable ballasts available for 1.83 m tubes do not work as well as those for 1.22 m tubes. See, for example, the comprehensive online database to be found on the internet at http://light-light.com/ which lists all commercially available fluorescent lamps and ballasts. This database lists no commercially available dimmable or non-dimmable ballasts for fluorescent tubes longer than 1.83 m.

The fact that 2.44 m non-dimmable hf fluorescent tube ballasts are not commercially available is surprising, since there has been a trend since at least 1981 to use non-dimmable hf ballasts for improved energy efficiency whenever possible. High frequency ballasts are, however, known to suffer from various problems.

One problem results from the relatively greater power and hence current and voltage requirements of 2.44 m fluorescent tubes as compared with shorter tubes. Inefficiencies in the ballast circuitry, including transformers, result in excess heating within the ballast unit, which can be damaging to solid state circuit elements. The space within a typical fluorescent tube fitting is quite limited, and it is believed that the build up of heat owing to the relatively greater power requirements has meant that it has not been possible or economic to manufacture a high frequency ballast for a 2.44 m fluorescent tube with a commercially acceptable failure rate, e.g. of less than IA in the first year after installation.

Another problem is that the circuitry conventionally used generates what are known as "harmonics" and to transmit these harmonics back into the power supply grid. This is a particular problem in certain industrial situations where, for example, a factory may have many hundreds of 2.44 m tubes on a number of lighting circuits supplied through a local step down transformer. In such a situation, harmonics can lead to overloading of transformers, adding of current to the neutral in three phase electrical distribution systems, current/voltage surges or spikes due to circuit resonances with one or more of the harmonic frequencies, and interference with other electronic equipment.

As a result, standards have been introduced to limit the amount of harmonic distortion produced by high frequency ballasts.

It is an object of the invention to provide a circuit for a high frequency ballast for a gas discharge lamp that addresses these problems and which may be dimmable, and which may be used with certain types of gas discharge lamp such as high output 2.44 m fluorescent lamps which to date have not benefited from the increased efficiencies possible with high frequency operation.

SUMMARY OF THE INVENTION

According to the invention, there is provided an electronic circuit for controlling a gas discharge lamp, comprising generation means for generating a high frequency pulse train that may be applied to the electrodes of the lamp to light the lamp, means for connecting the means for generating a high frequency pulse train to an electrical power source, a choke to limit the current drawn by the lamp, characterized in that the circuit comprises means for producing a first series of pulses and means for producing a second series of pulses independently from the first series of pulses, and means for combining additively the first and second series of pulses to produce the high frequency pulse train.

In a preferred embodiment of the invention, the circuit is for a fluorescent lamp.

The term high frequency is intended to exclude frequencies above those used for mains supply, i.e. above 50 to 60 Hz. The value of the high frequency may depend on a number of factors, in particular the type of lamp and the physical size and power rating of the lamp.

The arrangement is such that the rms power level of the high frequency pulse train is determined by the first and second series of pulses, and in particular because the series of pulses are independent of each other may be set.

The use of two independent pulse trains combined additively also makes it possible for the voltages of the first and second series of pulses to be less than that supplied as the combined high frequency pulse train applied to the lamp. For example if the voltages of the two series of pulses are the same, then these can then be made to add together so that the combined pulse train has a voltage double that of the each of the series of pulses. The use of lower voltages improves safety and simplifies the design of the generation means.

The choke serves in use to limit the current drawn by the lamp once the gas discharge is struck, and also to provide a high voltage boost to initiate the discharge when the lamp is first started.

Preferably, the means for combining the first and second series of pulses includes the choke which connects together the first and second series of the pulses.

The means for combining the first and second series of pulses includes an isolating transformer means to electrically isolate the lamp from the power source. The output of the circuit would then be floating. It has been found that this helps to prevent capacitive transfer of high frequency voltage to the glass envelope of the lamp, which can cause a unpleasant sensation when the lamp is touched when it is on.

When the circuit is for controlling the light output of a gas discharge lamp, the circuit additionally comprises means for shifting the phase of the first series of pulses relative to the second series of pulses, the means for combining the first and second series of pulses thereby varying the width of pulses in the pulse train.

By varying the width of the pulses in the pulse train, it is possible to control the rms power supplied to the lamp.

For example, the circuit may comprise means to detect a variation in a supply voltage from the power source. The means for shifting the phase of the first series of pulses relative to the second series of pulses may then responding to a variation in the supply voltage so that the lamp output may be held steady as the supply voltage varies.

The lamp may then also be controlled dimmably, if the circuit comprises light level control means for setting a desired intensity of light output from the lamp. The means for shifting the phase of the first series of pulses relative to the second series of pulses may then responding to the light level control means so that the lamp output may be set at a desired level as the width of the pulses is varied.

It is also possible that the circuit can control a lamp according to the whether or not there is a need foe the light to be on. For example, the circuit may comprise motion detection means to detect motion of an object, such as a person, in the vicinity of the circuit. The light level control means may then respond to the motion detection means so that the lamp output may be set at a desired level according to the detected motion as the width of the pulses is varied.

Whether the circuit is for dimmably controlling or for steadily driving the lamp, the means for combining the first and second series of pulses preferably comprises a first transformer and a second transformer, the primaries of each transformer receiving respectively the first and second series of pulses, each of the secondaries having a tap which may be electrically connected to the contacts of the lamp and each having another tap electrically connected to a choke so that the choke combines the secondaries and the choke in series between the contacts. The choke is thereby in series with the pulse train.

The choke serves in use to give a high voltage boost if the lamp starts to flicker off at very low power levels, so ensuring that the circuit may control the lamp power close to zero without the need for complicated feedback and lamp drive control circuitry.

The choke also serves to round off any square edges on the high frequency pulse train as the lamp is striking, and it is believed that this effect is important at helping the lamp to work steadily at low power levels, and also to come on at low power levels without the need for any heater element pre-heating delay.

In a preferred embodiment of the invention, the circuit has paired outputs each pair of which provides a steady low voltage output which may be applied to heated electrodes of the lamp.

Then at least one of the transformers may have a secondary winding with a pair of taps that may be electrically connected to heater elements of the lamp. One of the secondary taps for the heater element may then be electrically connected to one of the secondary taps for the lamp contacts so that the heater elements can then receive high frequency pulses with a power level sufficient to heat the heater elements.

Preferably, this power level should be substantially constant and, in the case of the circuit for dimmably controlling the lamp, unaffected by the phase shifting of the first and second series of pulses with respect to one another.

The modulation means may vary the width of each pulse in the pulse train similarly, that is, so that the ratio of on/off time for each combined high frequency pulse is substantially the same.

It would, however, alternatively be possible to vary the width of each combined high frequency pulse in the pulse train dissimilarly, that is, so that the ratio of on/off time for at least some of the adjacent pulses in the pulse train are not substantially the same, so long as the gaps between pulses do not become so long that the pulse train becomes substantially discontinuous, so causing the tube to flicker off at lower average duty cycles.

The pulse train may comprise pulses of just one polarity, but preferably comprises pulses of both positive and negative polarity.

Circuitry such as that described above is not bulky and may readily be incorporated in a light fitting having contacts for a gas discharge lamp. Alternatively, the circuit may be separate from the light fitting, although it would be necessary to provide appropriate transmission lines, e.g. coaxial cable, and shielding to prevent stray leakage of electromagnetic radiation.

The invention will be further described by way of example to the accompanying drawings.

BRIEF DESCRIPTION OF THE DRAWINGS

FIGS. 6A to 6L are photographs of oscilloscope traces showing voltages representative of the current supplied by the inverter to the fluorescent lamp, as measured using a feedback winding on the choke; and FIGS. 7A to 7I are photographs of oscilloscope traces showing the voltage supplied by the inverter to the fluorescent lamp, as measured across the lamp.

DETAILED DESCRIPTION

Figure 1:
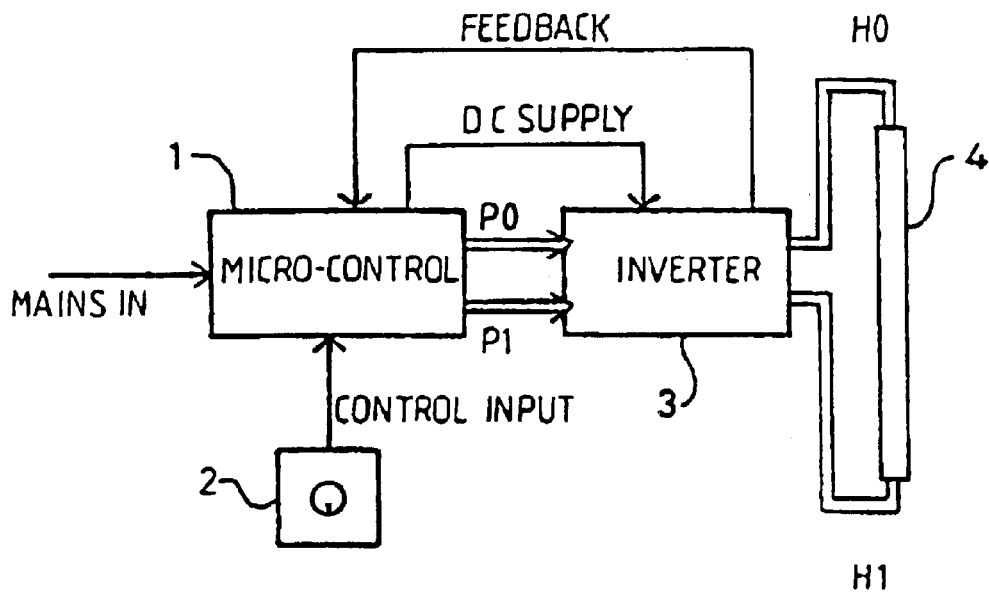
FIG. 1 is a schematic diagram of a circuit for dimmably controlling a fluorescent lamp according to the invention, having a micro-controller which controls an inverter circuit connected to the lamp.
Figure 2:
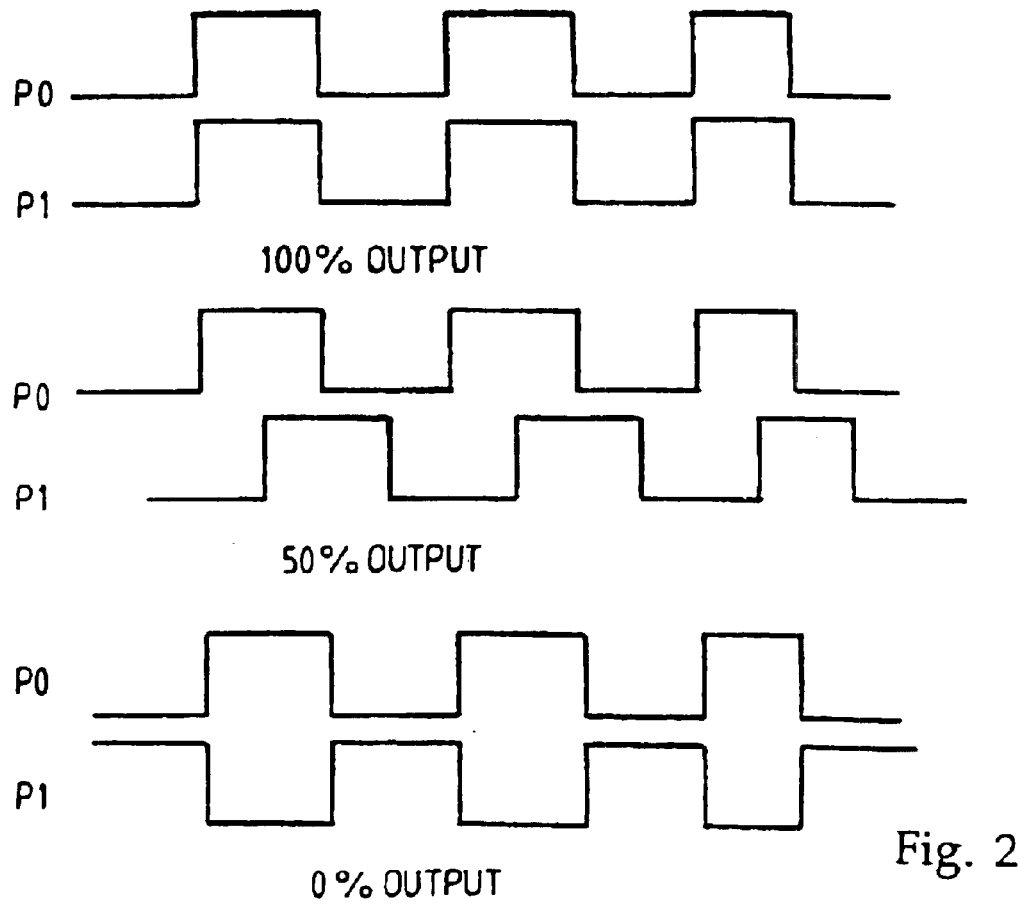
FIG. 2 is a diagram of a pair of wave forms generated by the inverter circuit of FIG. 1.

Referring first to FIGS. 1 and 2, a micro-controller 1 is connected to mains electrical power and a dimmer switch 2. The micro-controller has standard circuitry for mains rectification and stabilization (not shown), and supplies an inverter circuit 3 with dc power at 320 V, in addition to low voltage dc supply $V_{cc}$ at 5 V and three independent supplies $V_{DD1}$, $V_{DD2}$ and $V_{DD3}$ at 15 V. The inverter circuit 3 is of the rapid start type.

There is also a feedback line from the inverter 3 to the micro-controller 1, providing a voltage representative of the current drawn by the fluorescent lamp or tube 4, for compensating for line voltage variations and temperature variations of the tube.

The micro-controller digitally generates a pair of signals P0 and P1 which are fed into the inverter circuit 3 as inverter input signals. These input signals are each an essentially continuous train or series of pulses of 0–5 V dc square waves at about 80 kHz with a 50% duty cycle and, as will be explained in more detail further on, the signals P0 and P1 are in phase when the dimmer switch 2 is set for maximum and become progressively out of phase as the dimmer is turned down to off, at which point the signals are out of phase.

Output signals H0, H1 from the inverter 3 are connected to a fluorescent lamp 4, in this example a standard tube 2.44 m (8 feet) long with a rated nominal power of 125 W. Each end of the tube has two contacts connected to the output signals H0, H1 for driving a heater filament in the lamp (not shown) and for supplying the voltage and current needed to strike and light the lamp.

Figure 3:
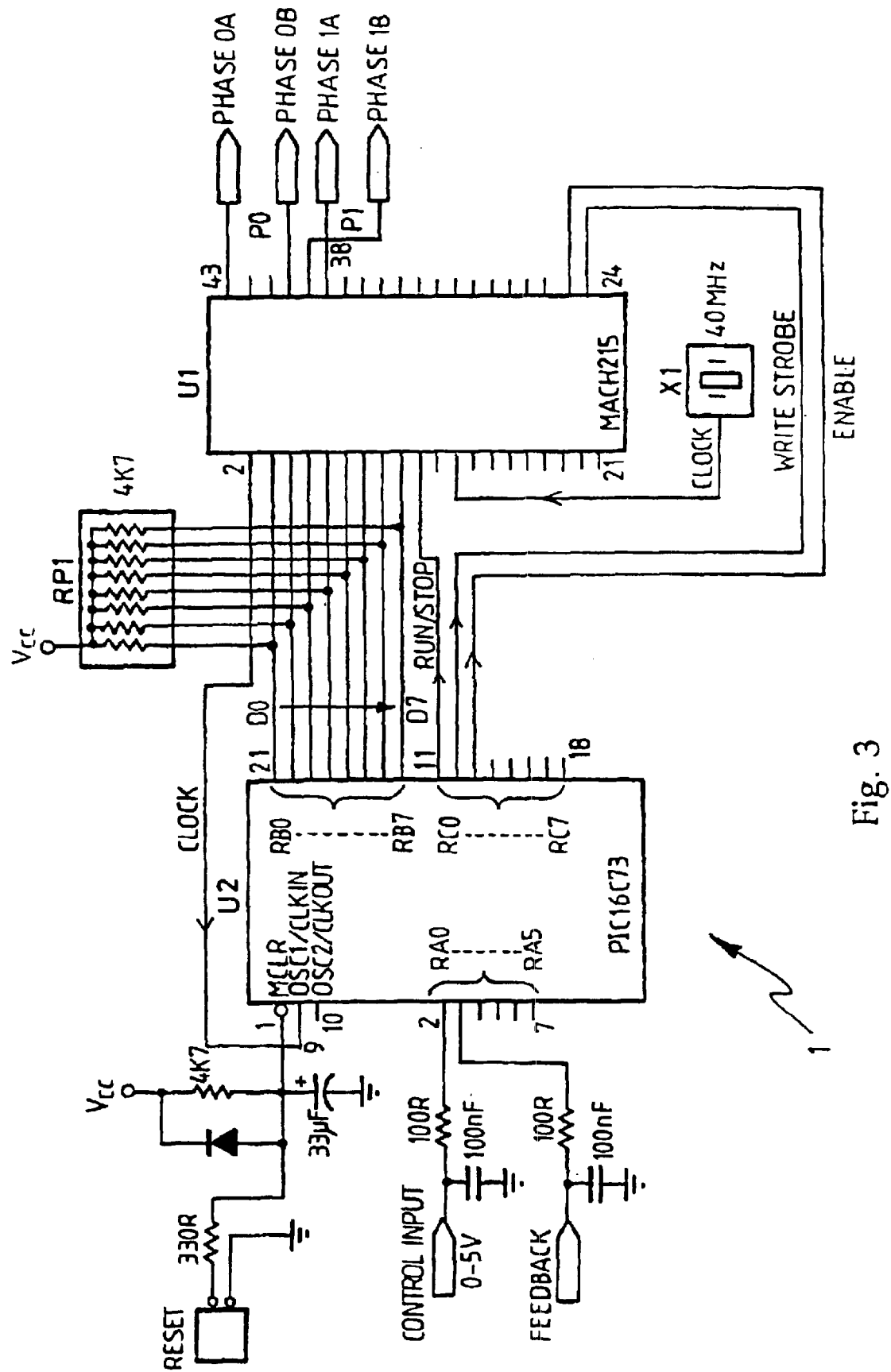
FIG. 3 is a circuit diagram of the micro-controller of FIG. 1.

FIG. 3 is a circuit diagram of part of the micro-controller 1 comprising a programmable logic device (PLD) chip U1 manufactured by Advanced Micro Devices Inc. as part number MACH215. Chip U1 comprises a counter fed on line 13 a clock signal by a 40 MHz crystal X1. The dimmer switch 2 produces a standard 0–10 V dc output signal, which is converted to 0–5 V dc control input, before being digitized into eight bits D0–D7 by a microcontroller chip U2 manufactured by Arizona Microchip Inc as part number PIC16C73A. The digitized control input is fed to lines 3–10 of chip U1. Each of these lines is connected to a 4.7 kohm pull-up resistor through resistor pack RP1 to the 5 V dc positive supply Vcc to ensure that a high signal has the correct voltage.

Chip U2 is powered on after a delay from a Reset in a conventional manner.

The 40 MHz signal from the crystal X1 is divided by 255 inside the chip U1, and this yields a 156.86 kHz signal which is used by firmware in U1 to toggle an output line 41, labelled "PHASE 1A", of chip U1 at 78.43 kHz.

Line 39, labelled "PHASE 1B" is made the logical inverse of PHASE 1A so that the voltage difference between PHASE 1A and PHASE 1B is the square wave signal described in FIGS. 1 and 2 as the inverter input signal P1. The absolute phase of this signal therefore does not vary.

Available inside chip U1 is a count at 40 MHz from 0 to 255 over one-half cycle of the signal P1. The 8 bits D0–D7 of the digitized 0–5 V control input signal representing the output of the dimmer switch 2 are then compared by firmware in chip U1 with the 40 MHz count from 0 to 255. The chip U1 output line 43, labelled "PHASE 0A", toggles from low to high, and from high to low, whenever the value of the digitized dimmer signal is equal to the value of the 40 MHz count. PHASE 0A, together with its logical inverse from line 40, labelled as "PHASE 0B", produce the square wave signal described in FIGS. 1 and 2 as the inverter input signal P0. The absolute phase of the P0 inverter input signal relative to the P1 inverter input signal therefore may be varied from in phase (when the voltage from the dimmer switch is 10 V and the count value is 255) to out of phase (when the voltage from the dimmer switch is 0 V and the count value is 0). The P0 and P1 signals are therefore the origin of a first and a second pulse train, each of the pulse trains being independent of the other.

Microcontroller U2 has outputs Run/Stop, Enable and Write Strobe passed respectively to control chip U1 lines 11, 24, 25. The Write Strobe ensures that the chip U1 latches in the 8 bit value D0–D7 representative of the dimmer switch setting at a defined point in the software cycle at which this value is compared with the 40 MHz count, so that a changing 8 bit value D0–D7 does not affect the operation of the firmware. The Run/Stop is used to switch off the inverter circuit 3 through firmware in U1.

The Enable line is not used in this embodiment of the invention, but could be used to implement pulse width modulation of the pulse train applied to the fluorescent tube 4. When Enable goes high, both P0 and P1 are made to go in phase, whether or not the count is set to 255. It would therefore be possible to make the Enable line switch between high and low at a frequency below the high frequency pulse train at 78.43 kHz, but above mains frequency, for example high 10% of the time and low 90t of the time, so that the width of each pulse in the combined high frequency pulse train is varied dissimilarly, that is, so that the ratio of on/off time for at least some of the adjacent pulses in the pulse train are not substantially the same.

Figure 4:
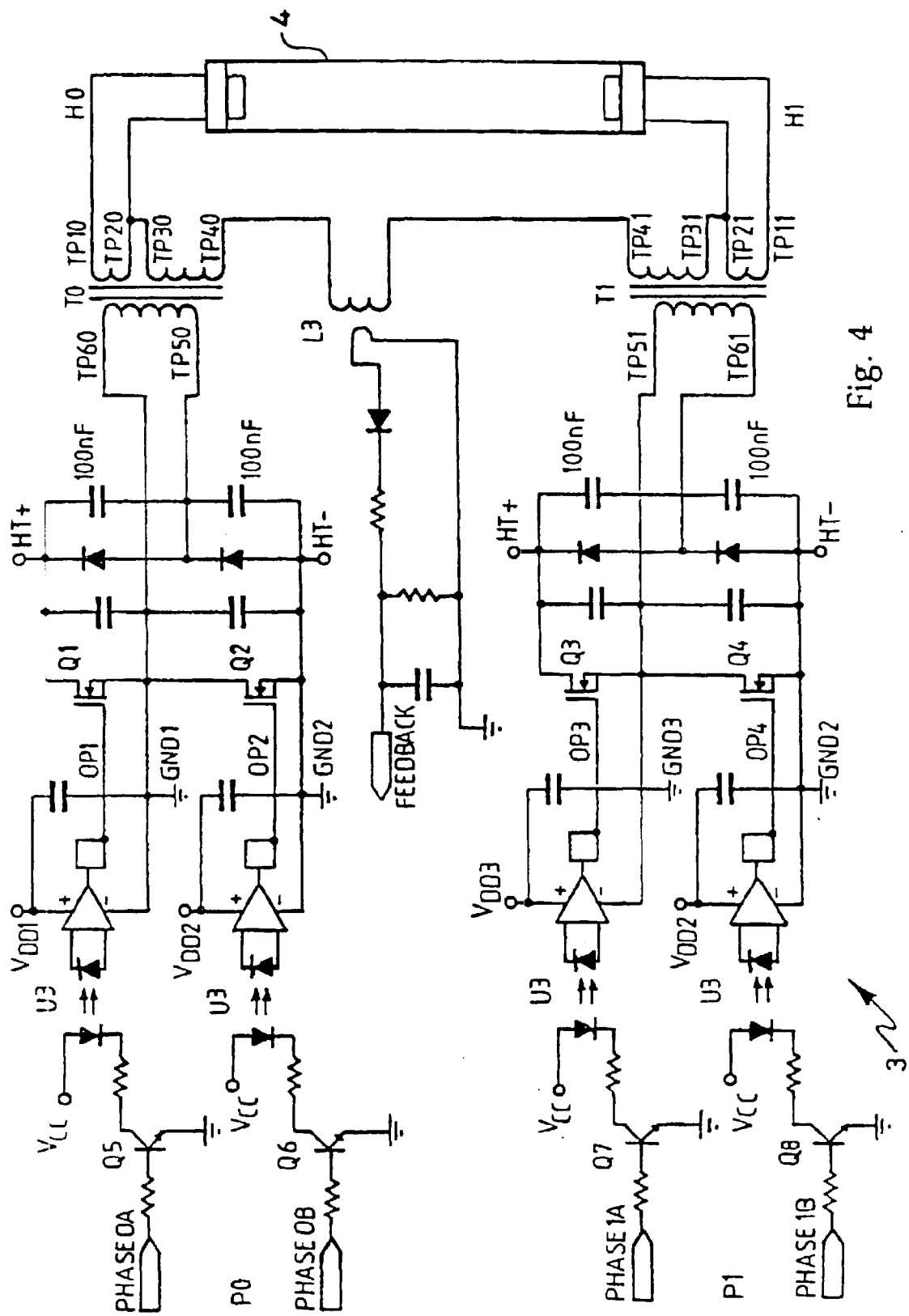
FIG. 4 is a circuit diagram of the inverter of FIG. 1 connected to the lamp.

The inverter circuit 3 is shown in more detail in FIG. 4, and comprises a pair of similar inverters receiving respectively the inverter input signals P0 and P1. Each signal is passed through a pair of BC337 npn transistors Q5,Q6 and Q7,Q8 to an opto-coupler chip U3, the chip U3 being available from Hewlett Packard as part number HPCL3150. The chip U3 is supplied with three independent supplies $V_{DD1}$, $V_{DD2}$ and $V_{DD3}$ each at 15 V and each with its own ground GND1, GND2 and GND3, in order to convert input signals P0 and P1 to 15 V output signals OP1, OP2 and OP3, OP4, which are then passed to a driver circuit which generates through one or the other of a similar pair of step-up output coupling transformers T0, T1, a square wave output signal matching the 0–5 V input signal P0, P1.

The output signal is generated in the following way. Outputs OP1,OP2 and OP3,OP4 are each used to switch a pair of power MOSPETs Q1, Q2 and Q3,Q4, type IRF840, each pair of MOSFETs being wired in series and spanning rectified power rails HT−, HT+ respectively at 0 and 320 V dc. When OP1 (or OP3) goes high, so OP2 (or OP4) goes low goes, and so when one MOSFET is on, the other is off, and vice versa. The voltage at the point between the MOSFETS is half the rail voltage, being split by a pair of 100 nF capacitors. This arrangement produces an output voltage at ±160 V with respect to the half rail across the primary winding of each inverter output transformer T0,T1 that follows the input voltage at 0–15 V across the MOSFETs. The ratio of primary to secondary windings is 34:51.

The secondary windings of each of the output transformers T0 and T1 have taps TP10,TP20,TP30,TP40 and TP11, TP21, TP31,TP41 at the same number of turns, but in the opposite order so that the output voltages and currents are in the opposite sense. For each transformer, one pair of taps TP10,TP20 or TP11,TP21 supplying 4 V is connected across the heater elements in the fluorescent tube 4 to provide a sufficiently small heating current at 78.43 kHz which remains steady as the phases of the input and output signals are varied with respect to each other.

Another pair of taps TP30,TP40 and TP31,TP41 from each of the output transformers T0,T1 span most of the turns of the secondary windings. One tap TP30 or TP31 from each of the pairs of taps is connected, respectively to tap TP20 or TP21, and therefore also to one of the lamp heater contacts, with the other two taps TP40,TP41 being connected together through an inductor or choke L3, so that most of the secondary turns of each of the output transformers T0,T1 together with the inductor L3 are in series. The main outputs from the transformers T0,T1 are therefore combined additively by the connection through the choke L3, and this provides the benefit of increasing the voltage present across the tube 4.

When the circuit is energised, current flows in alternate directions around the loop through the tube 4, transformer T0,T1 main secondaries and the choke L3. Because the choke is placed symmetrically between the secondaries, there is only the need for one choke, which helps to reduce resistive losses.

Figure 5:
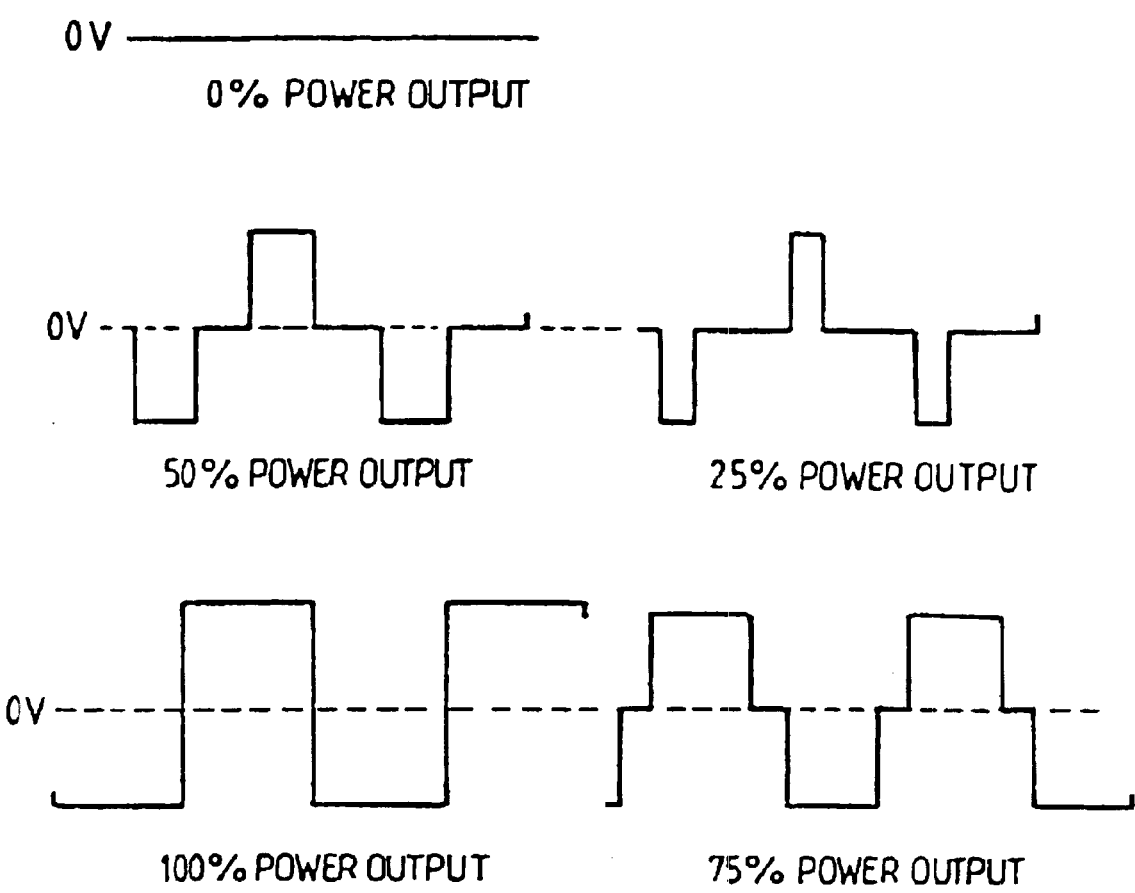
FIG. 5 is a schematic diagram of the output from the inverter across the fluorescent lamp.

The operation of the inverter circuit of FIG. 4 with the fluorescent lamp 4 may be appreciated with reference also to FIG. 5 which shows schematically the voltage difference between the two taps TP30,TP31 (or, equivalently, the voltage difference between the two taps TP40,TP41). A dashed line at 0 V indicates the point at which there is no net voltage difference across these taps. When the signals P0 and P1 are out of phase, there is effectively no net voltage across the tube 4 and inductor L3. When the signals P0 and P1 are in phase, the voltages through the output transformers T0,T1 add, to produce the signal labelled in the drawing as "100% Power Output". The resultant voltages are also shown schematically for 25% and 75% output. The inverter circuit 3 therefore combines the pulse train signals P0 and P1 in such a way as to produce resultant voltages which have a varying pulse width for each positive and negative going pulse, the width varying from effectively 100% of a half cycle of the resultant pulse train down to 0% of a half cycle.

FIGS. 6A to 6L show photographs of oscilloscope traces of a voltage representative of the current through the inductor L3. The twelve traces show the changes in current from nearly full power to nearly no power. FIGS. 7A to 7I show photographs of oscilloscope traces of the voltage present across the fluorescent tube. The nine traces show the changes in voltage from nearly full power to nearly no power. Both sets of traces are labelled with "step numbers" that correspond with the data in Table 1 below:

TABLE 1

| FIG. | Step N° | P (W) Meter | P (W) I · V | Light % | Effic L/P % | Temp (° C.) |
| --- | --- | --- | --- | --- | --- | --- |
| 6A | 219 | 120 | 123.2 | 100.0 | 100.0 | 31 |
| 6B | 173 | 111 | 112.2 | 91.8 | 99.3 | 31 |
| 6C | 150 | 101 | 101.2 | 83.7 | 99.4 | 29 |
| 6D | 120 | 88 | 90.2 | 76.8 | 104.8 | 30 |
| 6E | 106 | 81 | 81.4 | 71.4 | 105.8 | 29 |
| 6F | 90 | 69 | 70.4 | 56.9 | 99.0 | 28 |
| 6G | 77 | 60 | 61.6 | 45.2 | 90.5 | 27 |
| 6H | 62 | 50 | 50.6 | 31.9 | 76.5 | 24 |
| 6I | 50 | 40 | 39.6 | 21.5 | 64.6 | 22 |
| 6J | 47 | 23 | 24.2 | 2.2 | 11.4 | 19 |
| 6K | 28 | 20 | 19.8 | 0.5 | 3.3 | 17 |
| 6L | 1 | 18 | 19.8 | 0.3 | 1.8 | 15 |

The "Step N°°" value is the value of the digitized dimmer signal which shifts the phase of the signals P0 and P1 in and out of phase, with step number values of 255 and 0 being, respectively in phase and out of phase.

The "P Meter" values were measured with an electrical power meter on the mains supply to the apparatus; this measured value takes account of the power factor, that is any phase shift between current I and voltage V which would tend to reduce the consumed power. The "P I·V" values are calculated from measured values of mains supply voltage V and current I, with no correction for any phase differences between V and I. It will be noted that the close correspondence between the power levels as measured with the meter and those calculated from current I and voltage V shows that unlike conventional fluorescent drivers, the power factor is effectively unity, that is there is effectively no phase shift between current and voltage. The circuit according to the present invention may therefore be useful even when the circuit is used just to drive a gas discharge lamp at a steady power, (i.e. with no phase shift of the first and second series of pulses) since there will be no cumulative shift in power factor as a large number of lamps and circuits are connected to the mains in close proximity with one another.

The mains voltage levels were steady at 220 V throughout the data run. The temperature values were measured with a probe on the glass envelope of the tube, which was a standard 2.44 m (8 feet) long fluorescent tube, manufactured by Osram and nominally rated 125 W.

The light levels were measured with a lux meter with the data normalised to 100% at the reading closest to nominal rated full power of the tube, i.e. 120 W, at which the "step number" was 219.

The column labelled "Effic" gives the relative efficiency of the lamp 4 and electronic circuitry 1, 2, 3, that is, a value representing Light/P Meter normalised to 100% at step number 219. It will be noted that the relative efficiency is still about 90% when the light has been dimmed to about 45% of nominal full output. Only when the light output has been dimmed to about 21% at a step value of 50, does the efficiency drop off sharply from about 65% when the step value is decreased to 47.

Further data taken using the same equipment and tube, but under ambient conditions warmer than those for the data of Table 1, are set out in Table 2 below for the full range of step values between 1 and 255:

TABLE 2

| Step N° | P (W) Meter | P (W) I · V | Light % | Effic L/P % | Temp (° C.) |
|---|---|---|---|---|---|
| 255 | 136 | 134.2 | 105.8 | 94.9 | 38 |
| 245 | 134 | 132.0 | 104.6 | 95.3 | 38 |
| 234 | 129 | 127.6 | 102.3 | 96.8 | 38 |
| 219 | 122 | 118.8 | 100.0 | 100.0 | 38 |
| 173 | 112 | 107.8 | 93.3 | 101.5 | 36 |
| 150 | 103 | 99.0 | 88.2 | 104.4 | 36 |
| 120 | 88 | 83.6 | 76.3 | 105.8 | 36 |
| 106 | 75 | 72.6 | 64.0 | 104.2 | 34 |
| 90 | 63 | 59.4 | 52.2 | 101.0 | 33 |
| 77 | 55 | 50.6 | 44.3 | 98.3 | 32 |
| 62 | 41 | 35.2 | 29.0 | 86.2 | 31 |
| 50 | 19 | 15.4 | 5.6 | 35.8 | 30 |
| 47 | 17 | 13.2 | 3.5 | 25.0 | 28 |
| 29 | 15 | 11.0 | 1.2 | 9.4 | 25 |
| 1 | 15 | 4.4 | 0.5 | 3.8 | 24 |

The data at step value 219 closest to the nominal 125 W rated power of the lamp is highlighted in bold on both tables for ease of comparison. The higher ambient temperatures lead to a higher actual light output, and therefore the step value below which the relative light output and relative efficiency begins to drop sharply, is here step number 62. The light output may, however, still be dimmed to about 29% of nominal full output at this point.

Although not implemented in the example described herein, the feedback line from the inverter 3 to the microcontroller 1, providing a voltage representative of the current drawn by the fluorescent lamp or tube 4, may be used to compensate for temperature variations of the tube.

Referring again to FIGS. 6A to 6L, these show photographs of oscilloscope waveforms representative of the current through the fluorescent tube. In all cases the horizontal time base was set at 2.5 µs/division, making 25 µs across each photograph, with a vertical scale of 2 V/division. A voltage for the traces was generated by a current probe comprising a single turn of wire around the inductor L3, the current through the inductor L3 being essentially the same as the current through the fluorescent tube 4.

Since the inductor L3, together with the secondary windings of transformers T0,T1 between taps TP30,TP40 and TP31,TP41, is in series with the fluorescent tube 4, the impedance of the inductor L3 works as a current limiter to limit the current supplied from the inverters, and also to shape the rise and fall times of the current through the fluorescent tube. It has been found that the selected impedance of the inductor is important insofar as it shapes the rise and fall time of the current through the fluorescent tube 4.

The two transformers T0,T1 and the inductor L3 use a rectangular module and a ferrite core, grade 3C85, manufactured by Philips Components.

Correct design of inductor L3 helps the fluorescent tube to be dimmed to a lower level than would otherwise be possible. It is also important because if the lamp fails to strike, or flickers out at low power, the voltage across the inverters would increase and an auto-restrike would occur. Because of the high frequency operation, this would happen so quickly, that the eye would not be able to detect this restrike.

From Table 1, it can be seen that the apparatus according to the invention may be used to dim a standard 2.44 m (8 feet) long fluorescent tube to less than 1% of full light output. However, because of inevitable power losses in the electronic circuitry and essentially constant heating of the heater elements in the fluorescent tube, the effective range when power saving is the main concern is down to about 22% of full light output.

Although difficult to quantify, it has also been observed that the steadiness and the colour quality of the light output of fluorescent tubes driven by electronic circuits according to the invention, is superior to that achieved by conventional circuits of the type mentioned above. In particular, the colour quality appears to be more constant and whiter than with conventional apparatus as the power is dimmed towards nearly off.

Another advantage is that the power factor of the circuit as connected to the mains is close to unity, as can be seen from Table 1 by comparison of the columns for "Power" and "Power I·V". The circuit described above also does not inject any significant harmonics back into the power supply. Conventional ballasts relying on relatively large inductive chokes can induce a significant lag between voltage and current.

The circuit also allows operation at about 80 kHz. Compared with a conventional high frequency ballast operating at about 35 kHz, this permits a significant size reduction in transformer windings, and hence in the overall size of the ballast unit. For example, the circuit above has been packaged with all other necessary components in a casing measuring just 40 mm×45 mm×320 mm (height×width× length).

Although the invention has been described specifically with reference to a standard 2.44 m (8 feet) long cylindrical fluorescent tube, those skilled in the art will appreciate that the circuit described above may be adapted for other types of fluorescent tube, for example longer or shorter cylindrical tubes, and also compact fluorescent lamps such as those with shaped or curved tubes and those intended as replacements in incandescent light bulb fittings.

The electronic circuit according to the invention can also be used to drive and dimmably or non-dimmably control other types of lamps such as metal halide (HID) and low and high pressure sodium vapour lamps. Such lamps are often used for outdoor lighting such as street lighting. The electronic circuit according to the invention may be then be used with such lamps to dim these when full light output is not needed, such as the small hours of the morning, this saving significant amounts of electrical power and reducing the problem of light pollution around built up areas.

For example, the circuitry described above has also been used to drive and dimmably control 70 W and 250 W high pressure sodium lamp of the type SON-T and also 250 W high pressure sodium lamps with a phosphorescent coating of the type SON-E. These lamps are noted for their high efficiency and used mainly for lighting of roads, and public buildings and spaces. Other lamps that have been successfully driven and dimmed are low pressure sodium lamps up to 250 W, type SOX manufactured by Osram, and high pressure mercury vapour lamps, up to 70 W.

In the case of so-called cold electrode lamps, i.e. those that do not have an electrode heater element and which have just one electrical contact at each electrode, a circuit similar to that described above may be used, with the modification that the wire leading from the end of the secondary to complete a heater element circuit is omitted.

It would also be possible to fit motion detectors, such as those using passive-infra-red sensors, to such dimmable lamps, to control automatically the degree of dimming, for example depending on whether anyone or any vehicle was moving near the lamp.

The circuit described above may, of course, also be modified to drive a fluorescent lamp non-dimmably, for example by providing a constant control input voltage at 5 V in place of the signals from a dimmer or by omitting the part of the circuitry in FIG. 3 to do with shifting the phases of the first and second series of pulses.

Gas discharge lamps driven and dimmably or non-dimmably controlled by electronic circuits according to the invention may therefore be suitable for use in many applications in the home and industry, both indoor and outdoor.

What is claimed is:

1. An electronic circuit for both striking and continuously lighting a gas discharge lamp, the circuit comprising means for generating a high frequency pulse train for being applied to the electrodes of the lamp to light continuously the lamp, means for connecting the means for generating a high frequency pulse train to an electrical power source, and a choke to limit the current drawn by the lamp, characterized in that the circuit comprises means for producing a first high frequency series of pulses and means for producing independently of the first series of pulses a second high frequency series of pulses, and means for combining additively the first and second high frequency series of pulses to produce the high frequency pulse train.

2. The electronic circuit of claim 1, wherein the means for combining additively the first and second series of pulses includes the choke which connects together the first and second series of pulses.

3. The electronic circuit of claim 2, wherein the circuit has paired outputs each pair of which provides a steady low voltage output for being applied to heated electrodes of the lamp.

4. The electronic circuit of claim 3, wherein the means for combining the first and second series of pulses includes an isolating transformer to electrically isolate the lamp from the power source.

5. The electronic circuit of claim 4, wherein the means for combining the first and second series of pulses comprises a first transformer and a second transformer, the primaries of each transformer receiving respectively the first and second series of pulses, each of the secondaries having a tap for being electrically connected to the contacts of the lamp and each having another tap electrically connected to the choke so that the choke combines the secondaries and the choke in a series between the contacts.

6. The electronic circuit of claim 5, wherein at least one of the transformers has a secondary with a pair of taps for being electronically connected to heater elements of the lamp.

7. The electronic circuit of claim 6, wherein one of the secondary taps for the heater element is electrically connected to one of the secondary taps for the lamp contacts.

8. The electronic circuit of claim 1, further comprising means for shifting the phase of the first series of pulses relative to the second series of pulses, the means for combining the first and second series of pulses thereby varying the width of pulses in the pulse train.

9. The electronic circuit of claim 8, further comprising means for detecting a variation in a supply voltage from the power source, the means for shifting the phase of the first series of pulses relative to the second series of pulses responding to a variation in the supply voltage so that the lamp output will be held steady as the supply voltage varies.

10. The electronic circuit of claim 9, further comprising light level control means for setting a desired intensity of light ouput from the lamp, the means for shifting the phase of the first series of pulses relative to the second series of pulses responding to the light level control means so that the lamp output will be set at a desired level as the width of the pulses is varied.

11. The electronic circuit of claim 10, further comprising motion detection means for detecting motion of an object in the vicinity of the circuit, the light level control means responding to the motion detection means so that the lamp output will be set at a desired level according to the detected motion as the width of the pulses is varied.

12. The electronic circuit of claim 1, in which the pulse train comprises pulses of both positive and negative polarity.

13. The electronic circuit of claim 1, further comprising a light fitting having contacts for the gas discharge lamp.

14. An electronic circuit for controlling a gas discharge lamp, comprising means for generating a high frequency pulse train for being applied to the electrodes of the lamp to light the lamp, means for connecting the means for generating a high frequency pulse train to an electrical power source, and a choke to limit the current drawn by the lamp, characterized in that the means for generating the high frequency pulse train comprises means for producing a first series of pulses and means for producing a second series of pulses independently of the first series of pulses, and means for combining additively the first and second series of pulses to produce the high frequency pulse train, the circuit further comprising means for shifting the phase of the first series of pulses relative to the second series of pulses, the means for combining the first and second series of pulses thereby varying the width of pulses in the pulse train, and means for detecting a variation in a supply voltage from the power source, the means for shifting the phase of the first series of pulses relative to the second series of pulses responding to a variation in the supply voltage so that the lamp output will be held steady as the supply voltage varies.

15. The electronic circuit of claim 14, further comprising light level control means for setting a desired intensity of light output from the lamp, the means for shifting the phase of the first series of pulses responding to the light level control means so that the lamp output will be set at a desired level as the width of the pulses is varied.

16. The electronic circuit of claim 10, further comprising motion-detection means for detecting motion of an object in the vicinity of the circuit, the light level control means responding to the motion detection means so that the lamp output will be set at a desired level according to the detected motion as the width of the pulses is varied.

* * * * *